United States Patent
Moman et al.

(10) Patent No.: US 10,717,791 B2
(45) Date of Patent: Jul. 21, 2020

(54) PROCATALYST FOR POLYMERIZATION OF OLEFINS

(71) Applicant: SABIC GLOBAL TECHNOLOGIES B.V., Bergen op Zoom (NL)

(72) Inventors: Akhlaq Moman, Riyadh (SA); Abdulaziz Al-Humydi, Riyadh (SA); Inaamul Haq Siddiqui, Riyadh (SA); Sudhakar R. Padmanabhan, Riyadh (SA); Bandar Abdullah Almohammadi, Riyadh (SA); Ahmad Abdullah Alshaiban, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/780,538

(22) PCT Filed: Nov. 23, 2016

(86) PCT No.: PCT/EP2016/078499
§ 371 (c)(1),
(2) Date: May 31, 2018

(87) PCT Pub. No.: WO2017/093092
PCT Pub. Date: Jun. 8, 2017

(65) Prior Publication Data
US 2018/0362680 A1 Dec. 20, 2018

Related U.S. Application Data

(60) Provisional application No. 62/401,469, filed on Sep. 29, 2016.

(30) Foreign Application Priority Data

Dec. 2, 2015 (EP) ..................................... 15197471

(51) Int. Cl.
C08F 110/06 (2006.01)

(52) U.S. Cl.
CPC ................................. C08F 110/06 (2013.01)

(58) Field of Classification Search
CPC .................................................. C08F 110/06
See application file for complete search history.

(56) References Cited

U.S. PATENT DOCUMENTS

| 4,414,132 A | 11/1983 | Goodall et al. |
| 4,535,068 A | 8/1985 | Job |
| 6,825,146 B2 * | 11/2004 | Kilty ....................... C08F 10/06 502/104 |
| 2012/0322962 A1 * | 12/2012 | Chen ....................... C08F 10/06 526/123.1 |

FOREIGN PATENT DOCUMENTS

| WO | 2011106500 A1 | 9/2011 |
| WO | 2014118164 A1 | 8/2014 |
| WO | 2015185490 A1 | 12/2015 |

OTHER PUBLICATIONS

International Search Report for International Application No. PCT/EP2016/078499, International Filing Date Nov. 23, 2016, dated Mar. 16, 2017, 6 pages.
Written Opinion for International Application No. PCT/EP2016/078499, International Filing Date Nov. 23, 2016, dated Mar. 16, 2017, 10 pages.

* cited by examiner

Primary Examiner — Catherine S Branch
(74) Attorney, Agent, or Firm — Cantor Colburn LLP

(57) ABSTRACT

A procatalyst for polymerization of olefins, which procatalyst is based on a magnesium compound of the formula MgR'R" wherein R' is an alkoxide or aryloxide group and R" is an alkoxide or aryloxide group or halogen, an activator being a monoester and an internal donor represented by a compound according to formula A:

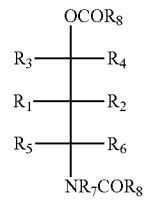

Formula A as described herein. Also described is a polymerization catalyst system comprising the procatalyst, a co-catalyst and optionally an external electron donor; a process of making a polyolefin, by contacting an olefin with the catalyst system; a polyolefin, obtained by or obtainable by the process; and a polyolefin, having a molecular weight distribution of between 4 and 15, a molecular weight ($M_w$) of between 300,000 to 1,500,000 g/mol, a melting temperature of more than 150° C., a value for the xylene solubles of less than 4 wt. % and a shaped article therefrom.

11 Claims, No Drawings

PROCATALYST FOR POLYMERIZATION OF OLEFINS

CROSS REFERENCE TO RELATED APPLICATIONS

This application is a National Stage application of PCT/EP2016/078499, filed Nov. 23, 2016, which claims the benefit of U.S. Provisional Application No. 62/401,469, filed Sep. 29, 2016, and European Application No. 15197471.4, filed Dec. 2, 2015, all of which are incorporated by reference in their entirety herein.

The present invention is related to a procatalyst for polymerization. Such catalyst systems are generally referred to as "Ziegler-Natta" catalysts comprising a transition metal-containing solid catalyst compound (also typically referred to as a procatalyst); an organometallic compound (also typically referred to as a co-catalyst) and optionally one or more electron donor compounds (e.g. external electron donors).

Such a procatalyst is for example known from U.S. Pat. Nos. 4,414,132 and 4,535,068 wherein a magnesium compound, such as magnesium diethoxide, is reacted with a titanium halide compound in the presence of a halohydrocarbon and e.g. ethyl benzoate or p-methyl toluate as internal donor and moreover an acid halide, such as benzoyl chloride. A disadvantage of these procatalyst is that the value for the xylene solubes is often too high. Moreover, when traces of benzoyl chloride are present this might be toxic and this is hence undesirable.

It is an object of the present invention to provide a novel procatalyst that is phthalate free and shows improved values for the XS. It is another object of the present invention to provide a procatalyst that has a high productivity. It is another object of the present invention to provide a novel procatalyst having increased control of product molecular weight distribution, molecular weight and xylene solubles, and enhanced hydrogen response.

SUMMARY OF THE PRESENT INVENTION

The present invention relates to a procatalyst for polymerization of olefins, which procatalyst is based on a magnesium compound of the formula MgR'R", wherein R' is an alkoxide or aryloxide group and wherein R" is an alkoxide or aryloxide group or halogen, preferably a magnesium dialkoxide compound, that has been reacted with tetravalent titanium halide, an activator being a monoester and an internal donor represented by a compound according to formula A:

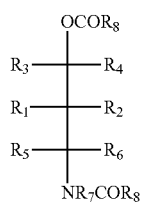

Formula A wherein each $R^8$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^1$, $R^2$, $R^3$, $R^4$, $R^5$, and $R^6$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^7$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; 0 is oxygen atom; and C is carbon atom.

In an embodiment, said activator is a benzoate ester, more preferably ethylbenzoate, and said internal donor is

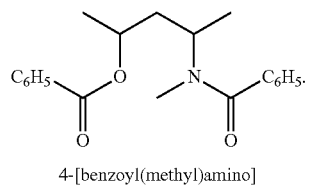

4-[benzoyl(methyl)amino]
pentan-2-yl benzoate (AB)

In an embodiment, said procatalyst has a content of the activator that is between 1 and 7 wt. %, such as between 2 and 5 wt. % based on the procatalyst weight.

In an embodiment, said procatalyst has a content of the internal donor of between 5 and 25 wt. %, preferably between 10 and 20 wt. %. based on the weight of the procatalyst.

In an embodiment, said procatalyst has a tetravalent titanium content of between 1.5 and 5.5 wt. %, preferably between 2.0 and 4.5 wt. % based on the procatalyst weight.

The present invention moreover relates to a procatalyst obtained or obtainable by a method for producing an olefin polymerization catalyst component, which method comprises the steps of:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and an activator being a monoester; to form a first intermediate product;

(b) contacting the first intermediate product with a mixture of a tetravalent titanium halide and an internal electron donor according to Formula A; to obtain a second intermediate product; and (c) washing the second intermediate product with an inert hydrocarbon liquid.

The present invention moreover relates to a procatalyst obtained or obtainable by a method for producing an olefin polymerization procatalyst, which method comprises the following steps:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and a monoester activator; to form a first intermediate product;

(b1) contacting the first intermediate product with a mixture of a tetravalent titanium halide and an internal electron donor according to Formula A; to obtain a second intermediate product; and (b2) contacting the second intermediate product with a tetravalent titanium halide to obtain a third intermediate product; and (c) washing the third intermediate product with an inert hydrocarbon liquid to obtain a procatalyst.

The present invention moreover relates to a procatalyst obtained or obtainable by a method for producing an olefin polymerization procatalyst, which method comprises the following steps:

(a) halogenating a magnesium compound of the formula MgR'R'' wherein R' is an alkoxide or aryloxide group and wherein R'' is an alkoxide or aryloxide group or halogen, with a tetravalent titanium halide in the presence of a halohydrocarbon and a monoester activator; to form a first intermediate product;

(b1) contacting the first intermediate product with a mixture of a tetravalent titanium halide and a first portion of an internal electron donor according to Formula A; to obtain a second intermediate product; and (b2) contacting the second intermediate product with a tetravalent titanium halide and a second portion of an internal electron donor according to Formula A to obtain a third intermediate product; and (c) washing the third intermediate product with an inert hydrocarbon liquid to obtain a procatalyst.

In an embodiment, said magnesium compound is dialkoxymagnesium, wherein said tetravalent titanium halide is a titanium tetrahalide, wherein said activator is ethylbenzoate, wherein said internal donor is 4-[benzoyl(methyl)amino]pentan-2-yl benzoate (AB) and wherein said inert hydrocarbon liquid is an alkane.

In an embodiment, said magnesium compound is diethoxymagnesium, wherein said tetravalent titanium halide is $TiCl_4$, and wherein said halohydrocarbon is chlorobenzene.

The present invention moreover relates to a polymerization catalyst system comprising the procatalyst according to the invention, a co-catalyst and optionally an external electron donor.

The present invention moreover relates to a process of making a polyolefin, preferably a polypropylene by contacting an olefin with the catalyst system according to the present invention.

The present invention moreover relates to a polyolefin, preferably a polypropylene, obtained by or obtainable by the process according to the present invention.

The present invention moreover relates to a polyolefin, preferably a polypropylene, having a molecular weight distribution of between 4 and 15, or even 7 to 10, with a molecular weight ($M_w$) of between 300,000 to 1,500,000 g/mol or even between 400,000 and 1,200,000 g/mol, having a melting temperature of more than 150° C. or even more than 165° C. and having a value for the xylene solubles of less than 4 wt. %, preferably less than 2.7 wt. % or even less than 2.5 wt. %. In other words, said polyolefin has a high MWD, a high molecular weight, a high melting temperature and low XS values.

The present invention moreover relates to a shaped article, comprising the polyolefin, preferably the polypropylene according to the present invention.

Definitions

The following definitions are used in the present description and claims to define the stated subject matter. Other terms not cited below are meant to have the generally accepted meaning in the field.

"internal donor" or "internal electron donor" or "ID" as used in the present description means: an electron-donating compound containing one or more atoms of oxygen (O) and/or nitrogen (N). This ID is used as a reactant in the preparation of a solid procatalyst.

"activator" as used in the present description means: an electron-donating compound containing one or more atoms of oxygen (O) and/or nitrogen (N) which is used to during the synthesis of the procatalyst prior to or simultaneous with the addition of an internal donor.

"external donor" or "external electron donor" or "ED" as used in the present description means: an electron-donating compound used as a reactant in the polymerisation of olefins. An ED is a compound added independent of the procatalyst.

"procatalyst" as used in the present description have the same meaning: a component of a catalyst composition generally comprising a solid support, a transition metal-containing catalytic species and optionally one or more internal donor.

"halide" as used in the present description means: an ion selected from the group of: fluoride (F—), chloride (Cl—), bromide (Br—) or iodide (I—).

"alkoxide" or "alkoxy" as used in the present description means: a functional group or side-chain obtained from a alkyl alcohol. It consists of an alkyl bonded to a negatively charged oxygen atom. "alkyl" as used in the present description means: an alkyl group being a functional group or side-chain consisting of carbon and hydrogen atoms having only single bonds. An alkyl group may be straight or branched and may be un-substituted or substituted. An alkyl group may also comprise alkenyl or alkylaryl groups.

"aryloxide" or "aryloxy" or "phenoxy" as used in the present description means: a functional group or side-chain obtained from an aryl alcohol. It consists of an aryl bonded to a negatively charged oxygen atom. "aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"MWD" or "Molecular weight distribution" as used in the present description means: the same as "PDI" or "polydispersity index". It is the ratio of the weight-average molecular weight (Mw) to the number average molecular weight (Mn), viz. Mw/Mn, and is used as a measure of the broadness of molecular weight distribution of a polymer. Mw and Mn are determined by GPC using a Waters 150° C. gel permeation chromatograph (GPC) combined with a Viscotek 100 differential viscosimeter; the chromatograms were run at 140° C. using 1,2,4-trichlorobenzene as a solvent; the refractive index detector was used to collect the signal for molecular weights.

"XS" or "xylene soluble fraction" or "CXS" or "cold soluble xylene fraction" as used in the present description means: the weight percentage (wt. %) of soluble xylene in the isolated polymer, measured according to ASTM D 5492-10.

"bulk density" as used in the present description means: the weight per unit volume of a material, including voids inherent in the material as tested. Bulk density is measured as apparent density according to ASTM D1895-96 Reapproved 2010-e1, test method A.

"d50" as used in the present description means: the Particle Size Distribution D50 or median diameter or medium value of the particle size distribution and is measured using Malvern SCIROCCO 2000 laser scattering detector according to ASTM D4464-15.

"production rate" or "yield" as used in the present description means: the amount of kilograms of polymer produced per gram of procatalyst consumed in the polymerization reactor per hour, unless stated otherwise.

Unless stated otherwise, when it is stated that any R group is "independently selected from" this means that when several of the same R groups are present in a molecule they may have the same meaning of they may not have the same meaning. For example, for the compound $R_2M$, wherein R is independently selected from ethyl or methyl, both R groups may be ethyl, both R groups may be methyl or one R group may be ethyl and the other R group may be methyl.

This present procatalyst has a has excellent catalyst productivity, increased control of product molecular weight distribution, molecular weight and xylene solubles, enhanced hydrogen response along with a short catalyst preparation time and low catalyst manufacturing costs.

The present inventors have observed that polymer produced with the present procatalyst surprisingly showed a combination of high tensile properties and high impact strength, which are highly desired properties for many different applications. Further a product with xylene solubles less than 4 wt. %, preferably 2.7% or even less than 2.5 wt. % was produced according to the present invention, which could potentially target increased stiffness products as per current market requirements.

DETAILED DESCRIPTION OF THE PRESENT INVENTION

As discussed above the present invention relates to a procatalyst for polymerization of olefins, which procatalyst is based on a magnesium compound of the formula MgR'R", wherein R' is an alkoxide or aryloxide group and wherein R" is an alkoxide or aryloxide group or halogen, preferably a magnesium dialkoxide compound, that has been reacted with a tetravalent titanium halide, an activator being a monoester and an internal donor represented by a compound according to formula A.

The present inventors have observed that one or more objects of the present invention can be achieved by such a procatalyst.

In an embodiment, said activator is a benzoate ester, more preferably ethylbenzoate (EB), and said internal donor is 4-[benzoyl(methyl)amino]pentan-2-yl benzoate (AB). According to the present inventors this specific combination of EB activator and AB internal donor in this type of catalyst provides optimal results. The combination of EB as activator and AB as internal donor in combination with a more complex procatalyst based on a magnesium compound prepared from a reaction product of Grignard and silane compounds is know (e.g. from WO2014/118164). However, the present inventors have now found that the combination of a simpler catalyst, based on a magnesium compound that is halogenated and titanated together with EB as activator and AB as internal donor provides results that are better that expected. The Examples will more clearly show this effect.

In an embodiment, said procatalyst has a content of the activator that is between 1 and 7 wt. %, such as between 2 and 5 wt. % based on the procatalyst weight. The inventors observed that this provides optimal results.

In an embodiment, said procatalyst has a content of the internal donor of between 5 and 25 wt. %, preferably between 10 and 20 wt. %. based on the weight of the procatalyst. The inventors observed that this provides optimal results.

In an embodiment, said procatalyst has a tetravalent titanium content of between 1.5 and 5.5 wt. %, preferably between 2.0 and 4.5 wt. % based on the procatalyst weight. The inventors observed that this provides optimal results.

The present invention moreover relates to a procatalyst obtained or obtainable by a method for producing an olefin polymerization catalyst component, which method comprises the steps of:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and an activator being a monoester; to form a first intermediate product;

(b) contacting the first intermediate product with a mixture of a tetravalent titanium halide and an internal electron donor according to Formula A; to obtain a second intermediate product; OR (b1) contacting the first intermediate product with a mixture of a tetravalent titanium halide and an internal electron donor according to Formula A; to obtain a second intermediate product; and (b2) contacting the second intermediate product with a tetravalent titanium halide to obtain a third intermediate product; OR (b1) contacting the first intermediate product with a mixture of a tetravalent titanium halide and a first portion of an internal electron donor according to Formula A; to obtain a second intermediate product; and (b2) contacting the second intermediate product with a tetravalent titanium halide and a second portion of an internal electron donor according to Formula A to obtain a third intermediate product; and (c) washing the intermediate product with an inert hydrocarbon liquid.

The present inventors have observed that the use of an activator and internal donor in the procatalyst, provides an improved procatalyst. The present procatalyst can be prepared in a three step process, including steps (a), (b), and (c). Each of these steps is discussed below.

Step (a)

Step (a) relates to halogenating a magnesium compound of the formula MgR'R", wherein R' is an alkoxide or aryloxide group and wherein R" is an alkoxide or aryloxide group or halogen, with a tetravalent titanium halide in the presence of a halohydrocarbon and an activator; to form a first intermediate product.

Examples of suitable magnesium compounds of the formula MgR'R", wherein R' is an alkoxide or aryloxide group and wherein R" is an alkoxide or aryloxide group or halogen are disclosed in U.S. Pat. No. 4,535,068, column 4, lines 11-34 and in U.S. Pat. No. 4,414,132 column 2, lines 33-50 which sections are incorporated by reference. In an embodiment, the magnesium compound is according to MgR'R", wherein R' is an alkoxide or aryloxide group and R" is an alkoxide or aryloxide group, most preferably R'=R". In an embodiment, the magnesium compound is a dialkoxymagnesium compound wherein, in the formula of MgR'R", R' is an alkoxide and R" is an alkoxide, most preferably R'=R". In an embodiment, the magnesium compound is diethoxymagnesium, wherein R'=R"=ethoxide (viz. —$OCH_2CH_3$). In an embodiment, R' may comprise between 1 and 20 carbon atoms. In an embodiment, R" may comprise between 1 and 20 carbon atoms.

Suitable examples of tetravalent titanium compounds are disclosed in U.S. Pat. No. 4,535,068, column 4, lines 53-58 and in U.S. Pat. No. 4,414,132 column 3, lines 3-8 which sections are incorporated by reference. Examples are: dialkoxy-titanium dihalides, alkoxy-titanium trihalides, phenoxy-titanium trihalides and titanium tetrahalides. In an embodiment, the tetravalent titanium compound is a titanium tetrahalide, preferably $TiCl_4$.

Suitable examples of the halohydrocarbon are disclosed in U.S. Pat. No. 4,535,068, column 4, line 59-column 5, line 9 and in U.S. Pat. No. 4,414,132 column 3, lines 10-25 which sections are incorporated by reference. In an embodiment, the halohydrocarbon is an aromatic halohydrocarbon, such as (di)chlorobenzene. In an embodiment, the halohydrocarbon is chlorobenzene. In addition to said halohydrocarbon an inert diluent or solvent may also be present. The same inert solvents as used in step (c) may also be used here.

The ratio between the amount of titanium compound and halohydrocarbon may for example between 25:75 and 75:25, such as between 60:40 and 40:60 or even 50:50 (all in v/v).

During step (a) the halogenation of magnesium is preferably carried out in such a manner that magnesium halide is formed in which the atomic ratio of halogen to magnesium is at least 1.2, preferably at least 1.5. The molar ratio of the magnesium compound and the titanium compound during step (a) are in an embodiment between 0.005:1 and 2:1, preferably between 0.01:1 to 1:1.

In an embodiment, the activator is a monoester, preferably a benzoate ester, more preferably ethylbenzoate. More monoesters are discussed in WO 2014/118164, page 7, line 28 to page 8 lines 26, which section is incorporated by reference. The amount of the activator may be such that the content of the activator in the procatalyst is between 1 and 7 wt. %, such as between 2 and 5 wt. % based on the procatalyst weight.

The molar ratio of the internal electron donor relative to the magnesium may vary between wide limits, for instance from 0.01 to 5.0. Preferably, this molar ratio is from 0.02 to 2.0. More preferably, this molar ratio is from 0.05 to 0.5.

Step (a) may be carried out at temperatures ranging e.g. between 60° C. to 140° C., preferably between 80° C. to 120° C., more preferably between 100° C. to 120° C., such as 110° C. In an embodiment, the starting compounds are first mixed at room temperature, e.g. 25° C., and subsequently heated. Step (a) may be carried out for a duration of between 0.1 and 6 hours, preferably between 0.5 and 3.5 hours, such as between 0.5 and 1.0 hour.

After step (a) preferably an additional step is carried out, being step (a'): step (a') filtrating the reaction mixture obtained in step (a) to obtain a solid product, being the first intermediate reaction product. The retentate is the first intermediate reaction product. The filtrate may be discarded. Instead of filtrating, decanting may also be used.

Step (b)

Step (b) relates to contacting the first intermediate product with a tetravalent titanium halide and an internal electron donor. There are several aspects and embodiments to this step that will be discussed below.

Suitable examples of tetravalent titanium compounds are disclosed in U.S. Pat. No. 4,535,068, column 4, lines 53-58 and in U.S. Pat. No. 4,414,132 column 3, lines 3-8 which sections are incorporated by reference. In an embodiment, the same tetravalent titanium compound is used in each of the steps (a) and (b). Examples are: dialkoxy-titanium dihalides, alkoxy-titanium trihalides, phenoxy-titanium trihalides and titanium tetrahalides. In an embodiment, the tetravalent titanium compound is a titanium tetrahalide, preferably $TiCl_4$. In an embodiment, $TiCl_4$ is used in each of the steps (a) and (b).

Suitable examples of the halohydrocarbon are disclosed in U.S. Pat. No. 4,535,068, column 4, line 59-column 5, line 9 and in U.S. Pat. No. 4,414,132 column 3, lines 10-25 which sections are incorporated by reference. In an embodiment, the halohydrocarbon is an aromatic halohydrocarbon, such as (di)chlorobenzene. In an embodiment, the halohydrocarbon is chlorobenzene.

The ratio between the amount of titanium compound and halohydrocarbon may for example between 25:75 and 75:25, such as between 60:40 and 40:60 or even 50:50 (all in v/v).

The titanation treatments increase the content of titanium in the solid catalyst. Preferably, the final atomic ratio of tetravalent titanium to magnesium in the procatalyst obtained is between 0.005 to 3.0, preferably from 0.02 to 1.0.

In an embodiment, the final tetravalent titanium content is between 1.5 and 5.5 wt. %, preferably between 2.0 and 4.5 wt. % based on the procatalyst weight.

Step (b) may be carried out at temperatures ranging e.g. between 60° C. to 140° C., preferably between 80° C. to 120° C., more preferably between 100° C. to 120° C., such as 110° C. Steps (b), or (b1) or (b2) may be carried out for a duration of between 0.1 and 6 hours, preferably between 0.25 and 2 hours, for example 0.33 to 1 hour, such as 0.5 hours.

After step (b) (or afters both of steps (b1) and (b2) preferably an additional step is carried out, being respectively step (b')/(b1')/(b2'):

step (b') filtrating the reaction mixture obtained in step (b) to obtain a solid product, being the second intermediate reaction product. The retentate is the second intermediate reaction product. The filtrate may be discarded. Instead of filtrating, decanting may also be used.

step (b1') filtrating the reaction mixture obtained in step (b1) to obtain a solid product, being the second intermediate reaction product. The retentate is the second intermediate reaction product. The filtrate may be discarded. Instead of filtrating, decanting may also be used.

step (b2') filtrating the reaction mixture obtained in step (b2) to obtain a solid product, being the third intermediate reaction product. The retentate is the third intermediate reaction product. The filtrate may be discarded. Instead of filtrating, decanting may also be used.

The internal donor is represented by a compound according to formula A wherein each $R^8$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^1$, $R_2$, $R^3$, $R^4$, $R^5$, and $R^6$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^7$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; O is oxygen atom; and C is carbon atom. In an embodiment, said compound according to Formula A is 4-[benzoyl(methyl)amino]pentan-2-yl benzoate (AB).

More compounds according to Formula A that are suitable, and more information about the preferred embodiments are discussed in WO 2014/118164, page 8, line 28 to page 10 line 8, which section is incorporated by reference. It should be noted that Formula I of WO 2014/118164 corresponds to Formula A according to the present invention.

In an embodiment, the content of the internal donor in the procatalyst (based on the weight of the procatalyst) is between 5 and 25 wt. %, preferably between 10 and 20 wt. %.

In a first aspect, step (b) comprises two sub steps (b1) and (b2): (b1) contacting the first intermediate product with a mixture of a tetravalent titanium halide and an internal electron donor; to obtain a second intermediate product; and (b2) contacting the second intermediate product with a tetravalent titanium halide to obtain a third intermediate product. In this aspect the internal donor is added in a single addition during step (b1). This embodiment, comprises in step (a) halogenation of magnesium, the addition of an activator and a $1^{st}$ titanation, in step (b1) the addition of a ID and a $2^{nd}$ titanation and in step (b2) a $3^{rd}$ titanation. Step (c) relates to the work up. A procatalyst prepared according to this first aspect produces a polymer having a regular or broad molecular weight distribution and a relatively low value for xylene solubles.

In a second aspect, step (b) comprises two sub steps: (b1) contacting the first intermediate product with a mixture of a tetravalent titanium halide and a first portion of an internal electron donor; to obtain a second intermediate product; and (b2) contacting the second intermediate product with a mixture of a tetravalent titanium halide and a second portion of an internal electron donor; to obtain a third intermediate product. This embodiment, comprises in step (a) halogenation of magnesium, the addition of an activator and a $1^{st}$ titanation, in step (b1) the addition of a ID and a $2^{nd}$ titanation and in step (b2) the addition of a ID and a $3^{rd}$ titanation. Step (c) relates to the work up. A procatalyst prepared according to this first aspect produces a polymer having a somewhat more narrow molecular weight distribution and an even lower value for xylene solubles.

The difference between the first and second embodiment is the fact that the internal electron donor is added in either a single step (step b) or b1)—first aspect) or in two separate steps (steps b1) and b2)—second aspect). By tuning this addition of the internal electron donor, the properties of the procatalyst may be tuned. In this aspect, the first portion and the second portion combined make up 100% of the internal electron donor. The division between the first and second portions may for example be from 80%/20% to 20%/80%, more preferably 60%/40% to 40%/60%, most preferably 50%/50%; viz. during each of b1 and b2 half of the total amount is added.

Step (c)

Step (c) relates to washing the intermediate product obtained with an inert hydrocarbon liquid.

The washing of step (c) may be carried out with one or more washing cycles. During each washing cycle the solid intermediate product is contacted with an amount of intern hydrocarbon liquid and mixed. For example, two, three, four, five, six or seven washing cycles may be carried out. The amount of liquid added during each washing cycle may be determined by the person skilled in the art. The liquid may be different or the same during each washing cycle, preferably the same. The amount of liquid may be different or the same during each washing cycle, preferably the same.

In an embodiment, step (c) may be carried out at a temperature of between room temperature and 100° C., preferably between room temperature and 60° C. The temperature during step (c) may be constant or may be decreased, e.g. from 60° C. to 25° C., in several steps. For example when 5 washing cycles are carried out, the temperature may be decreased with each cycle. The temperature may be determined by the temperature of the liquid to be added or by external cooling or heating.

In an embodiment, the inert hydrocarbon liquid is an alkane, such as n-pentane, isopentane, n-hexane, n-heptane, iso-octane, preferably n-heptane or isopentane. However, toluene may also be used. This inert hydrocarbon liquid is used to wash the solid intermediate product obtained. During this washing any unreacted material, including physically absorbed halohydrocarbon may be removed.

After step (c) preferably an additional step is carried out, being step (c'): step (c') filtrating the reaction mixture obtained in step (c) to obtain a solid product, being the procatalyst. The retentate is the procatalyst. The filtrate may be discarded. Instead of filtrating, decanting may also be used.

The procatalyst can be used as such wetted by the solvent or suspended in solvent or it can be first dried, preferably partly dried, for storage. After step (c') preferably an additional step is carried out, being step (c''): step (c'') drying the solid product obtained in step (c'). This step may for example be carried out by conventional dryings means, such as a flow of an inert gas, e.g. dry nitrogen, during a certain period of time, e.g. between 0.5 and 10 hours, e.g. between 1 and 3 hours, such as 2 hours. Drying can e.g. be carried out by low pressure nitrogen flow for several hours preferably at temperature from 10 to 100° C. depending on the boiling point of the solvent used, preferably from 15 to 70° C. The procatalyst obtained can be used as dried or suspended in mineral oil for storage.

In a further aspect, the present invention relates to a polymerization catalyst system comprising the procatalyst according to the invention, a co-catalyst and optionally an external electron donor. The co-catalyst may be any co-catalyst known in the art that is suitable for this purpose, for example an organoaluminum compound. Examples thereof are disclosed in U.S. Pat. No. 4,535,068, column 6, lines 45-55 and in U.S. Pat. No. 4,414,132 column 4, lines 43-53 which sections are incorporated by reference. The external electron donor may be any external electron donor known in the art that is suitable for this purpose. Examples thereof are disclosed in U.S. Pat. No. 4,535,068, column 6, lines 20-37 and in U.S. Pat. No. 4,414,132 column 4, lines 14-43 which sections are incorporated by reference. A preferred external electron donor is cyclohexylmethyldimethoxysilane. The ratio of external electron donor to atomic Ti from the procatalyst is between 100 to 1 and 1 to 1, such as 25 to 1.

To prepare the catalyst or catalyst system according to the present invention the procatalyst, co-catalyst and external electron donor may be simply combined.

In an embodiment, they are combined in such a manner that the ratio of aluminium from the co-catalyst to titanium from the procatalyst is between 1:1 and 500:1, preferably between 30:1 and 110:1.

The present invention moreover relates to a process of making a polyolefin, preferably a polypropylene by contacting an olefin with the catalyst system according to the present invention. Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

Said polymerization process may e.g. be a slurry/liquid or gas phase process. The polymerization is carried out at a temperature of between 0 and 120° C., preferably from 40° C. to 100° C., e.g. 67° C. The pressure during (propylene) (co)polymerization is for instance from 10 to 60 barg (bar gauge), preferably from 20 to 40 barg. The polymerization is carried out in a continuous or batch process.

The present invention moreover relates to a polyolefin, preferably a polypropylene, obtained by or obtainable by the process according to the present invention. The present invention moreover relates to a polyolefin, preferably a polypropylene, having a molecular weight distribution of between 4 and 15, preferably between 7 to 10; a molecular weight ($M_w$) of between 300,000 to 1,500,000 g/mol, preferably between 400,000 and 1,200,000 g/mol; a melting temperature of more than 150° C., preferably more than 165° C.; a value for the xylene solubles of less than 4 wt. %, preferably less than 2.7 wt. %, more preferably less than 2.5 wt. %.

Xylene soluble fraction (XS) is preferably from about 0.5 wt % to about 10 wt %, or from about 1 wt % to about 8 wt %, or from 2 to 6 wt %, or from about 1 wt % to about 5 wt %. Preferably, the xylene amount (XS) is lower than 6 wt %, preferably lower than 5 wt %, more preferably lower than 4 wt % or even lower than 3 wt % and most preferably lower than 2.7 wt %. In a most preferred embodiment, the XS value is less than 2.5 wt. % or even less than 2 wt. %.

The polyolefin, preferably the polypropylene according to the present invention has a molecular weight distribution higher than 5, preferably higher than 6, more preferably higher than 7 and for instance below 15 or even below 10.

The production rate is preferably from about 1 kg/g/hr to about 100 kg/g/hr, or from about 10 kg/g/hr to about 80 kg/g/hr. The bulk density is preferably more than 300 kg/m3. The percentage crystallinity is preferably between 40 and 60%. The tensile strength at yield is preferably between 30 and 60 MPa. The tensile strength at break is preferably between 10 and 40 MPa. The tensile elongation is preferably between 5 and 30%. The E-modulus is preferably between 1100 and 1600 MPa. The flexural strength is preferably between 20 and 60 MPa. The flexural modulus is preferably between 900 and 1300 MPa. The Izod impact is preferably between 15 and 40 J/m.

The present polymer may have fiber, BOPP and injection molding grades.

The present invention moreover relates to a shaped article, comprising the polyolefin, preferably the polypropylene according to the present invention.

The procatalyst according to the present was found to produce polyolefins with a molecular weight distribution of 4 to 15, or even 7 to 10. This range of molecular weight distribution which is suitable for fibre, biaxially orientated polypropylene film and injection molding articles applications.

When compared with more complex catalyst, such as those based on magnesium compound prepared from a reaction product of Grignard and silane compounds with numerous titanation steps, the present procatalyst has lower catalyst manufacturing costs due to elimination of the requirement of additional titanation steps, the lower requirement of the activator, no requirements regarding support activation and the utilization of a low cost support, superior titanation temperature stability. This allows a broader operation condition manufacturing window and higher catalyst productivity in polymerization. The present procatalyst has shown superior elasticity as compared to a similar procatalyst having a different donor and without activator.

The present invention is further elucidated based on the Examples below which are illustrative only and not considered limiting to the present invention. It should be noted that the embodiments stated for one aspect of the present invention are also applicable for any other aspect of the present invention unless stated otherwise.

EXAMPLES

Several different procatalysts were synthesized according to the Synthesis Examples below. The specifications of these procatalysts are provided in Table 1.

Table 1 shows in the first column the number of the synthesis example, in the second column the designation of the procatalyst, in the third column the activator as well as the amount thereof (between brackets), in the fourth column the internal donor as well as the amount thereof (between brackets), in the fifth column the d50 value in microns of the procatalyst particles obtained as determined by Malvern SCIROCCO 2000 laser scattering analysis by ASTM D4464-15, in the sixth through the tenth column the percentage of respectively magnesium, titanium, the internal donor, the activator and the alkoxide of the magnesium alkoxide starting product.

Then these different procatalysts were used in the polymerization of propylene. The details thereof are discussed in Polymerization Examples below and Table 2.

Table 2 shows in the first column the number of the polymerization example, in the second column the designation of the procatalyst, in the third column productivity for the production of PP (in kilogram per gram catalyst), in the fourth column the bulk density (in kilogram per cubic meter), in the fifth column the weight average molecular weight ($M_w$), (in grams per mole), in the sixth column the number average molecular weight ($M_n$), (in grams per mole), in the seventh column molecular weight distribution ($M_w/M_n$), in the eighth column the percentage of xylene solubles, in the ninth and tenth column the melting temperature ($T_m$) and crystallization temperature ($T_c$) respectively (in degrees celcius) and in the eleventh column the crystallinity percentage of the polymer; these temperatures have been determined by differential scanning calorimetry (DSC) according to ASTM D3418-12.

Table 3 shows in the first column the number of the polymerization example, in the second column the designation of the procatalyst, in the third and fourth column the tensile strength (in MPA), in the fifth column the tensile elongation, in the sixth column the E-modulus (in MPa), in the seventh and eighth column the flexural strength and modulus, respectively (in MPa) and in the ninth and last column the Izod impact (in J/m). Tensile properties were measures by ASTM D638M-96, flexural properties by ASTM D790-10 and Izod by ASTM D256-10e1 using a Zwick apparatus.

Synthesis Example 1: Preparation of Procatalyst A

Step a: Halogenation of Magnesium and $1^{st}$ Titanation

An amount of 4.5 g of magnesium ethoxide (with an average particle size of 538 microns) was placed in a 300 ml reaction-filtration flask under a nitrogen atmosphere. Then, 100 mL of a mixture of TiCl$_4$ and chlorobenzene (CB) (40:60 v/v) was added to the flask at a temperature of 25° C. Then, a solution of 0.8 mL ethylbenzoate (EB) in 3 mL CB was added to the flask at a temperature of 25° C. The resulting reaction mixture was heated to a temperature of 110° C. and stirred at that temperature for a period of 40 minutes. After the stirring was stopped, the reaction mixture obtained was filtered at 110° C.

Step b1: ID Addition and $2^{nd}$ Titanation

The filtrate was discarded and the solid was retained in the flask and subsequently, 100 mL of a mixture of TiCl$_4$ and CB (40:60 v/v) was added to the flask at a temperature of 25° C. Next, a solution of 1318 mg of internal donor 4-[benzoyl (methyl)amino]pentan-2-yl benzoate (AB) in 2 mL of CB was added to the flask. The resulting reaction mixture was heated to a temperature of 110° C. and stirred at that temperature for a period of 30 minutes. After the stirring was stopped, the reaction mixture obtained was filtered.

Step b2: $3^{rd}$ Titanation

The filtrate was discarded and the solid was retained in the flask and subsequently, 100 mL of a mixture of TiCl$_4$ and chlorobenzene (40:60 v/v) was added to the flask. The resulting reaction mixture was heated to 110° C. and stirred at that temperature for a period of 30 minutes. After the stirring was stopped, the reaction mixture obtained was filtered at 110° C.

Step c: Work Up

The filtrate was discarded and the solid was retained in the flask and subsequently, the contents of the flask were washed 5 times with 100 mL of heptane starting at a temperature of 60° C. The solid product was stirred for 5 minutes per wash prior to filtration in which the filtrate was discarded and the solid was retained in the flask. The temperature was gradually reduced from 60° C. to 25° C. during the washings. Finally, the solid product obtained was dried using a nitrogen purge at a temperature of 25° C. for a period of 2 hours. The specifications of this procatalyst are provided in Table 1.

Synthesis Example 2: Preparation of Procatalyst B

Synthesis Example 2 was carried out in the same way as Synthesis Example 1, except that 1058 mg of AB was used instead of 1318 mg. The specifications of this procatalyst are provided in Table 1.

Synthesis Example 3: Preparation of Procatalyst C

Step a: Halogenation of Magnesium and $1^{st}$ Titanation in Presence of the Activator An amount of 4.5 g of magnesium ethoxide (with an average particle size of 538 microns) was placed in a 300 ml reaction-filtration flask under a nitrogen atmosphere. Then, 100 mL of a mixture of TiCl$_4$ and chlorobenzene (CB) (40:60 v/v) was added to the flask at a temperature of 25° C. Then, a solution of 0.8 mL ethylbenzoate (EB) in 3 mL CB was added to the flask at a temperature of 25° C. The resulting reaction mixture was heated to a temperature of 110° C. and stirred at that temperature for a period of 40 minutes. After the stirring was stopped, the reaction mixture obtained was filtered at 110° C.

Step b1: $1^{st}$ Addition of Internal Donor and $2^{nd}$ Titanation

The filtrate was discarded and the solid was retained in the flask and subsequently, 100 mL of a mixture of TiCl$_4$ and CB (40:60 v/v) was added to the flask at a temperature of 25° C. Next, a solution of 659 mg of internal donor AB in 2 mL of CB was added to the flask. The resulting reaction mixture was heated to a temperature of 110° C. and stirred at that temperature for a period of 30 minutes. After the stirring was stopped, the reaction mixture obtained was filtered.

Step b2: $2^{nd}$ Addition of Internal Donor and $3^{rd}$ Titanation

The filtrate was discarded and the solid was retained in the flask and subsequently, 100 mL of a mixture of TiCl$_4$ and chlorobenzene (40:60 v/v) was added to the flask. Next, a solution of 659 mg of internal donor AB in 2 mL of CB was added to the flask. The resulting reaction mixture was heated to 110° C. and stirred at that temperature for a period of 30 minutes. After the stirring was stopped, the reaction mixture obtained was filtered.

Step c: Work Up

The filtrate was discarded and the solid was retained in the flask and subsequently, the contents of the flask were washed 5 times with 100 mL of heptane starting at a temperature of 60° C. The solid product was stirred for 5 minutes per wash prior to filtration in which the filtrate was discarded and the solid was retained in the flask. The temperature was gradually reduced from 60° C. to 25° C. during the washings. Finally, the solid product obtained was dried using a nitrogen purge at a temperature of 25° C. for a period of 2 hours. The specifications of this procatalyst are provided in Table 1.

Synthesis Example 4*: Preparation of Procatalyst D*

Step 1*) Halogenation of Magnesium and $1^{st}$ Titanation in Presence of the Internal Donor An amount of 5.7 g of magnesium ethoxide (with an average particle size of 538 microns) was placed in a 300 ml reaction-filtration flask under a nitrogen atmosphere. Then, 150 mL of a mixture of TiCl$_4$ and chlorobenzene (CB) (50:50 v/v) was added to the flask at a temperature of 25° C. Then, a solution of 2.4 mL ethylbenzoate (EB) in 3 mL CB was added to the flask at a temperature of 25° C. The resulting reaction mixture was heated to a temperature of 110° C. and stirred at that temperature for a period of 60 minutes. After the stirring was stopped, the reaction mixture obtained was filtered at 110° C.

Step 2*) $2^{nd}$ Titanation

The filtrate was discarded and the solid was retained in the flask and subsequently, 150 mL of a mixture of TiCl$_4$ and CB (50:50 v/v) was added to the flask at a temperature of 25° C. The resulting reaction mixture was heated to a temperature of 110° C. and stirred at that temperature for a period of 30 minutes. After the stirring was stopped, the reaction mixture obtained was filtered.

Step 3*) Reaction With Acid Halide and $3^{rd}$ Titanation

The filtrate was discarded and the solid was retained in the flask and subsequently, 150 mL of a mixture of TiCl$_4$ and chlorobenzene (50:50 v/v) was added to the flask. Next, 0.4 mL of benzoyl chloride was added to the flask. The resulting reaction mixture was heated to 110° C. and stirred at that temperature for a period of 30 minutes. After the stirring was stopped, the reaction mixture obtained was filtered.

Step 4*) Work Up

The filtrate was discarded and the solid was retained in the flask and subsequently, the contents of the flask were washed 6 times with 150 mL of isopentane at a temperature of 25° C. The solid product was stirred for 5 minutes per wash prior to filtration in which the filtrate was discarded and the solid was retained in the flask. Finally, the solid product obtained was dried using a nitrogen purge at a temperature of 40° C. for a period of 90 minutes. The specifications of this procatalyst are provided in Table 1.

Synthesis Example 5*: Preparation of Procatalyst E*

Synthesis Example 5* was prepared according to the procedure disclosed in the Example 4 of WO2014/0118164. The specifications of this procatalyst are provided in Table 1.

Polymerization Example 1: Polymerization Using Procatalyst A

Liquid pool propylene polymerization was carried out in a one gallon bench scale reactor. The method of polymerization involved baking the polymerization reactor at a temperature of 110° C. for a period of 60 minutes, then applying three high pressure (15 bar) nitrogen purges at a temperature 110° C., then lowering the reactor temperature to 30° C. whilst purging the reactor with nitrogen. Then the reactor was purged three times with 50 g of propylene for each purge. Then 1.375 kg of liquid propylene was introduced to the reactor followed by the addition of 200 psig hydrogen to the reactor from an 75 mL stainless steel cylinder. The reactor temperature was then raised to 62° C. with a stirring speed of 500 rpm and 0.25 mmol of the external electron donor, cyclohexylmethyldimethoxysilane, was injected into the reactor. Then, 2.0 mmol of a co-catalyst, triethylaluminium was injected in the reactor. Then the procatalyst, corresponding to 0.01 mmol Ti, was injected into the reactor. The reactor temperature was then raised to 67° C. and the stirring speed increased to 1500 rpm and polymerization was carried out for a period of 1 hour. After this period had expired, the propylene in the reactor was vented and product polypropylene was collected. The yield was determined after allowing the product to dry. Polymerization and product analysis results are given in Table 2.

Polymerization Example 2: Polymerization Using Procatalyst B

Polymerization Example 1 was repeated except that procatalyst B was used in the process. Polymerization and product analysis results are given in Table 2.

Polymerization Example 3: Polymerization Using Procatalyst C

Polymerization Example 1 was repeated except that procatalyst C was used in the process. Polymerization and product analysis results are given in Table 2.

Polymerization Example 4*: Polymerization Using Procatalyst D*

Polymerization Example 1 was repeated except that procatalyst D was used in the process. Polymerization and product analysis results are given in Table 2.

Polymerization Example 5*: Using Procatalyst E*

Polymerization Example 1 was repeated except that procatalyst E* was used in the process. Polymerization and product analysis results are given in Table 3.

TABLE 1

| S.E.# | Procat. | ACT ([mL]) | ID ([mL]) | d50 [μm] | Mg [%] | Ti [%] | ID [%] | ACT [%] | RO [%] |
|---|---|---|---|---|---|---|---|---|---|
| 1 | A | EB (0.8) | AB (1318) | 86.63 | 16.50 | 3.57 | 16.14 | 2.69 | 0.58 |
| 2 | B | EB (0.8) | AB (1058) | 63.17 | 16.43 | 3.63 | 16.88 | 2.96 | 0.67 |
| 3 | C | EB (0.8) | AB (659/659) | 80.13 | 16.78 | 3.43 | 16.88 | 2.00 | 0.31 |
| 4* | D*# | EB(2.4) | BC (0.4 mL)$ | 84.00 | 17.98 | 2.87 | — | 9.00 | 0.25 |
| 5* | E* | EB (EB/Mg = 0.15) | AB (AB/Mg = 0.15) | n.d. | n.d. | 3.0 | 11.4 | n.d. | n.d. |

*comparative example
50:50 v/v of TiCl$_4$/CB in all titanation steps instead of 40:60
$benzoyl chloride was added as activator

TABLE 2

| P.E.# | Procat. | Prod. [kg/g · cat] | BD [kg/m3] | Mw [g/mol] | Mn [g/mol] | MWD | XS [%] | Tm [° C.] | Tc [° C.] | Crys. [%] |
|---|---|---|---|---|---|---|---|---|---|---|
| 1 | A | 26.2 | 326 | 712,306 | 88,907 | 8.00 | 2.19 | 166.4 | 109.3 | 45.8 |
| 2 | B | 32.1 | 309 | 1,050,000 | 122,000 | 8.60 | 3.1 | 166.4 | 111.4 | 46.4 |
| 3 | C | 28.8 | 308 | 564,050 | 81,500 | 6.15 | 1.96 | 167.3 | 110.5 | 48.1 |
| 4* | D* | 17.5 | 330 | 151,650 | 21,750 | 6.97 | 4.56 | 162.0 | — | — |
| 5* | E* | 9.7 | n.d. | n.d. | n.d. | 8.7 | 3.2 | n.d. | n.d. | n.d. |

From this Table is clear that when a procatalyst according to the prior art (procatalyst D*) is compared to a procatalyst according to the present invention (procatalyst A) it can be observed that the productivity increases (from 17.5 to 26.2), the molecular weight (both Mw and Mn) increases as well as the MWD (from 6.97 to 8.00). The XS decreases (from 4.56 to 2.19). In other words, the present invention allows for a procatalyst providing a lower XS and higher productivity with a broad MWD.

The present invention allows further tuning of the desired properties by amending the way in which the inventive catalyst is prepared. When e.g. the internal donor is added in two portions/steps (procatalyst C) this gives rise to the following changes when compared to procatalyst A; e.g. the molecular weight and MWD decrease, the XS decreases even further. Hence also by tuning the method of preparing the catalyst according to the present invention, the properties of the final polymer may be tuned.

Another way of tuning the desired properties is by tuning the amount of internal donor as observed from the difference between procatalysts A and B. By decreasing the amount of internal donor, the productivity increases, the molecular weight and MWD increase but also the XS value. This clearly shows that by tuning the amounts of internal donors, the properties of the final polymer may be tuned.

Clauses

The following clauses define several aspects and embodiments of the invention.

1. A procatalyst for polymerization of olefins, which procatalyst is based on a magnesium compound of the formula MgR'R", wherein R' is an alkoxide or aryloxide group and wherein R" is an alkoxide or aryloxide group or halogen, preferably a magnesium dialkoxide compound, that has been reacted with a tetravalent titanium halide, an activator being a monoester and an internal donor represented by a compound according to formula A:

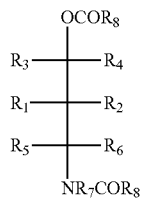

Formula A wherein each $R^8$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^1$, $R^2$, $R^3$, $R^4$, $R^5$, and $R^6$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^7$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; O is oxygen atom; and C is carbon atom.

2. A procatalyst for polymerization of olefins, which procatalyst is based on a magnesium compound of the formula MgR'R", wherein R' is an alkoxide or aryloxide group and wherein R" is an alkoxide or aryloxide group or halogen, preferably a magnesium dialkoxide compound, that has been reacted with a tetravalent titanium halide, an activator being a monoester and an internal donor represented by a compound according to formula A:

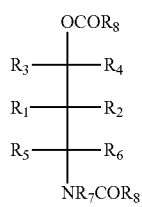

Formula A wherein each $R^8$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^1$, $R^2$, $R^3$, $R^4$, $R^5$, and $R^6$ are each independently selected from hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^7$ is a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; O is oxygen atom; and C is carbon atom.

3. A procatalyst according to clause 1 or 2, wherein said activator is a benzoate ester, more preferably ethylbenzoate, and said internal donor is

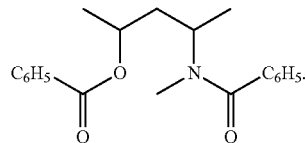

4-[benzoyl(methyl)amino]
pentan-2-yl benzoate (AB)

4. A procatalyst according to any or of the preceding clauses, having a content of the activator that is between 1 and 7 wt. %, such as between 2 and 5 wt. % based on the procatalyst weight.

5. A procatalyst according to any or of the preceding clauses, having a content of the internal donor of between 5 and 25 wt. %, preferably between 10 and 20 wt. %. based on the weight of the procatalyst.

6. A procatalyst according to any or of the preceding clauses, having a tetravalent titanium content of between 1.5 and 5.5 wt. %, preferably between 2.0 and 4.5 wt. % based on the procatalyst weight.

7. A procatalyst obtained or obtainable by a method for producing an olefin polymerization catalyst component, which method comprises the steps of:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and an activator being a monoester; to form a first intermediate product;

(b) contacting the first intermediate product with a mixture of a tetravalent titanium halide and an internal electron donor according to Formula A; to obtain a second intermediate product; and (c) washing the second intermediate product with an inert hydrocarbon liquid.

8. A procatalyst obtained or obtainable by a method for producing an olefin polymerization procatalyst, which method comprises the following steps:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and a monoester activator; to form a first intermediate product;

(b1) contacting the first intermediate product with a mixture of a tetravalent titanium halide and an internal electron donor according to Formula A; to obtain a second intermediate product; and (b2) contacting the second intermediate product with a tetravalent titanium halide to obtain a third intermediate product; and (c) washing the third intermediate product with an inert hydrocarbon liquid to obtain a procatalyst.

9. A procatalyst obtained or obtainable by a method for producing an olefin polymerization procatalyst, which method comprises the following steps:

(a) halogenating a magnesium compound of the formula MgR'R" wherein R' is an alkoxide or aryloxide group and wherein R" is an alkoxide or aryloxide group or halogen, with a tetravalent titanium halide in the presence of a halohydrocarbon and a monoester activator; to form a first intermediate product;

(b1) contacting the first intermediate product with a mixture of a tetravalent titanium halide and a first portion of an internal electron donor according to Formula A; to obtain a second intermediate product; and (b2) contacting the second intermediate product with a tetravalent titanium halide and a second portion of an internal electron donor according to Formula A to obtain a third intermediate product; and (c) washing the third intermediate product with an inert hydrocarbon liquid to obtain a procatalyst.

10. A procatalyst according to clauses 7-10, wherein said magnesium compound is dialkoxymagnesium, wherein said tetravalent titanium halide is a titanium tetrahalide, wherein said activator is ethylbenzoate, wherein said internal donor is 4-[benzoyl(methyl)amino]pentan-2-yl benzoate (AB) and wherein said inert hydrocarbon liquid is an alkane.

11. A procatalyst according to any one of clauses 7-10, wherein said magnesium compound is diethoxymagnesium, wherein said tetravalent titanium halide is $TiCl_4$, and wherein said halohydrocarbon is chlorobenzene.

12. A polymerization catalyst system comprising the procatalyst according to any of clauses 1 to 11, a co-catalyst and optionally an external electron donor.

13. A process of making a polyolefin, preferably a polypropylene by contacting an olefin with the catalyst system according to clause 12.

14. A polyolefin, preferably a polypropylene, obtained by or obtainable by the process according to clause 13.

15. A polyolefin, preferably a polypropylene, having:
a molecular weight distribution of between 4 and 15, preferably between 7 to 10;
a molecular weight ($M_w$) of between 300,000 to 1,500,000 g/mol, preferably between 400,000 and 1,200,000 g/mol;
a melting temperature of more than 150° C., preferably more than 165° C.;
a value for the xylene solubles of less than 4 wt. %, preferably less than 2.7 wt. %, more preferably less than 2.5 wt. %.

16. A shaped article, comprising the polyolefin, preferably the polypropylene according to clauses 14 or 15.

The invention claimed is:

1. A procatalyst for polymerization of olefins, which procatalyst is based on a magnesium compound of the formula MgR'R", wherein R' is an alkoxide or aryloxide group and wherein R" is an alkoxide or aryloxide group or halogen, that has been reacted with a tetravalent titanium halide, an activator being a monoester and an internal donor represented by a compound according to formula A:

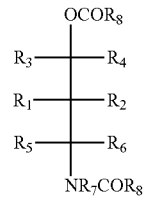

Formula A wherein each $R^8$ group is independently a linear, branched or cyclic hydrocarbyl group selected from alkyl, alkenyl, aryl, aralkyl, or alkylaryl groups, and one or more combinations thereof; $R^1$, $R^2$, $R^3$, $R^4$, $R^5$, and $R^6$ are each independently selected from hydrogen or a linear, branched or cyclic hydrocarbyl group, selected from alkyl, alkenyl, aryl, aralkyl, or alkylaryl groups, and one or more combinations thereof; $R^7$ is a linear, branched or cyclic hydrocarbyl group, selected from alkyl, alkenyl, aryl, aralkyl, alkoxycarbonyl or alkylaryl groups, and one or more combinations thereof; N is nitrogen atom; O is oxygen atom; and C is carbon atom, and wherein the procatalyst has a content of the activator that is between 1 and 7 wt. % based on the procatalyst weight, wherein the procatalyst is obtained by a method comprising:

(a) halogenating the magnesium compound of the formula MgR'R" with the tetravalent titanium halide in the presence of a halohydrocarbon and the monoester activator; to form a first intermediate product;

(b1) contacting the first intermediate product with a mixture of the tetravalent titanium halide and a first portion of the internal electron donor according to Formula A; to obtain a second intermediate product; and (b2) contacting the second intermediate product with the tetravalent titanium halide and a second portion of the internal electron donor according to Formula A to obtain a third intermediate product; and (c) washing the third intermediate product with an inert hydrocarbon liquid to obtain the procatalyst.

2. A procatalyst according to claim 1, wherein said activator is a benzoate ester, and said internal donor is

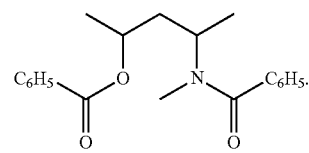

4-[benzoyl(methyl)amino]
pentan-2-yl benzoate (AB)

3. A procatalyst according to claim 1, having a content of the internal donor of between 5 and 25 wt. % based on the weight of the procatalyst.

4. A procatalyst according to claim 1, having a tetravalent titanium content of between 1.5 and 5.5 wt. % based on the procatalyst weight.

5. A procatalyst according to claim 1, wherein said magnesium compound is dialkoxymagnesium, wherein said tetravalent titanium halide is a titanium tetrahalide, wherein said activator is ethylbenzoate, wherein said internal donor is 4-[benzoyl(methyl)amino]pentan-2-yl benzoate (AB) and wherein said inert hydrocarbon liquid is an alkane.

6. A procatalyst according to claim 1, wherein said magnesium compound is diethoxymagnesium, wherein said tetravalent titanium halide is $TiCl_4$, and wherein said halohydrocarbon is chlorobenzene.

7. A polymerization catalyst system comprising the procatalyst according to claim 6, a co-catalyst and optionally an external electron donor.

8. A process of making a polyolefin by contacting an olefin with the catalyst system according to claim 7.

9. The procatalysts according to claim 1, wherein the magnesium compound of the formula MgR'R" is a magnesium dialkoxide compound.

10. The process according to claim 8, wherein the activator is ethylbenzoate.

11. The process according to claim 8, wherein the polyolefin is a polypropylene.

* * * * *